United States Patent [19]  [11] Patent Number: 4,811,925
Fujita et al.  [45] Date of Patent: Mar. 14, 1989

[54] SLIDE RAIL

[75] Inventors: Yasuyuki Fujita; Takaichi Nishino, both of Akishima, Japan

[73] Assignee: Tachi-S Co. Ltd., Tokyo, Japan

[21] Appl. No.: 881,842

[22] Filed: Mar. 7, 1986

[51] Int. Cl.⁴ .............................................. B60N 1/08
[52] U.S. Cl. ................................... 248/430; 296/65.1; 384/34
[58] Field of Search ............ 296/65 R; 248/393, 429, 248/430; 384/19, 20, 34, 37, 38, 42

[56] References Cited

U.S. PATENT DOCUMENTS

| 3,507,472 | 4/1970 | Agee et al. | 248/429 |
| 4,114,945 | 9/1978 | Lutz | 384/37 X |
| 4,515,404 | 5/1985 | Nishimura et al. | 248/429 X |
| 4,520,982 | 6/1985 | Nishino | 248/430 |
| 4,527,767 | 7/1985 | Rees | 248/429 X |
| 4,602,758 | 7/1986 | Mann et al. | 248/430 |

FOREIGN PATENT DOCUMENTS

| 889680 | 1/1972 | Canada | 248/429 |
| 1294110 | 4/1969 | Fed. Rep. of Germany | 384/37 |
| 2328846 | 12/1973 | Fed. Rep. of Germany | 296/65 R |
| 2547887 | 4/1977 | Fed. Rep. of Germany | 248/429 |
| 2549711 | 5/1977 | Fed. Rep. of Germany | 248/429 |
| 13152 | 3/1980 | Japan . | |
| 158332 | 11/1981 | Japan . | |
| 1257575 | 12/1971 | United Kingdom | 384/34 |

OTHER PUBLICATIONS

IBM Technical Disclosure Bulletin, vol. 15, No. 9, Feb. 1973, R. L. Theall.

Primary Examiner—Dennis H. Pedder
Attorney, Agent, or Firm—Oldham & Oldham Co.

[57] ABSTRACT

A slide rail is shown for adjusting the longitudinal position of a seat used in connection with a vehicle, such as an automobile. The slide rail comprises a moveable rail having a U-shaped lower section, and adapted for connection to the seat; upper and lower sliders, respectively disposed on the top and bottom surfaces of a flange forming part of the lower portion of the moveable rail; and a square fixed rail adapted for connection to the floor of the vehicle. The upper slider, which is formed from a desirably elastic material, has a number of vertically alternating projections on its top and bottom surfaces; lateral projections on its side surfaces; and slits disposed inwardly of the lateral projections. The flange is positioned in the fixed rail, together with the upper and lower sliders, so that the moveable rail can be slideably moved back and forth, providing the adjustment described.

11 Claims, 3 Drawing Sheets

SLIDE RAIL

BACKGROUND OF THE INVENTION

1. Field of the Invention

The present invention relates to a slide rail which is provided in a seat for a vehicle or the like so as to adjust the forward and rearward positions of the seat.

2. Description of the Prior Art

In a vehicle or the like, a seat is mounted via a slide rail to the floor side of the vehicle in such a manner that it can be moved forwardly and rearwardly.

In such slide rail, as a sliding member thereof, there is widely employed a slider formed of a resin material or the like which has an excellent sliding property. In the prior art, for example, one of such slide rails having sliders of this kind is disclosed in Japanese Utility Model Publication No. 13152 of 1980.

In other words, the disclosed slide rail is constructed as follows: the lower portion of an upper rail fixed to a seat is formed in a U-shaped configuration; a slide block formed of a resin material is mounted to the tip end portion thereof; and, the slide block is then inserted into a lower rail fixed to the seat floor side in such a manner that it is in close contact with the lower rail.

However, the above-mentioned conventional slide rail has a large sliding resistance since the slide block thereof is inserted into the lower rail in a face-to-face contact manner, and at the same time it may be loosened or produce a strange sound because there exists clearance between the upper and lower rails due to the dimensional errors therebetween, so that the slide rail cannot always be slidingly moved smoothly.

SUMMARY OF THE INVENTION

The present invention aims at eliminating the disadvantages found in the above-mentioned conventional slide rail.

Accordingly, it is a primary object of the invention to provide a slide rail which is provided with sliders improved in form and thus can be slidingly moved smoothly.

In attaining the above object, according to the invention, there is provided a slide rail in which a movable-side rail to be connected with the side of a seat is formed so as to have a lower portion of a U-shaped section, upper and lower sliders are respectively disposed over and under a lower flange formed in the movable rail lower portion, and the movable rail is inserted into a fixed-side, square-barrel-shaped rail to be fixed to the floor side of a vehicle via the upper and lower sliders in such a manner that the movable rail can be slidingly moved back and forth, characterized in that the upper slider is formed of a material having a desired elasticity and also that the upper slider is formed in the two side surfaces thereof with arc-shaped projections, in the top and bottom surfaces thereof with alternating spherical projections, and internally of the arc-shaped projections with slits.

Therefore, since the upper slider is formed in the above-mentioned manner, when it is inserted between the movable and fixed-side rails, the upper slider is resilienty deformed in a vertically undulating manner as the spherical projections formed alternatingly in the top and bottom surface of the upper slider are pressed against the two rails respectively, and at the same time the arc-shaped projections are deformed such that they are pushed in inwardly since the slits are collapsed. This resilient deformation of the upper slider can absorb any possible loosenesses between the movable and fixed rails, with the result that the movable rail can be slidingly moved smoothly relative to the fixed rail.

The above and other related objects and features of the invention will be apparent from a reading of the following description taken in connection with the accompanying drawings.

DETAILED DESCRIPTION OF A PREFERRED EMBODIMENT OF THE INVENTION

Figure 1:
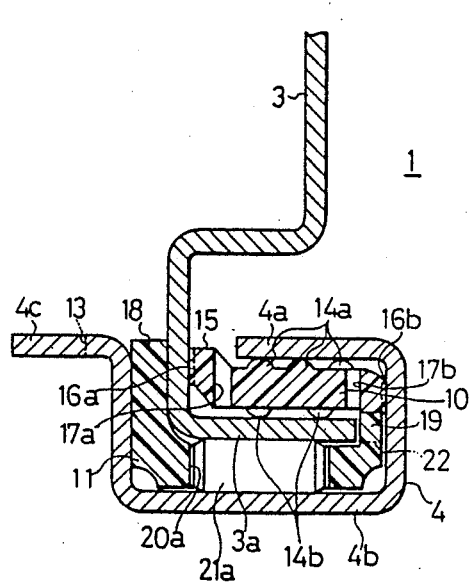
FIG. 1 is a longitudinally sectional view of a slide rail according to the invention.
Figure 2:
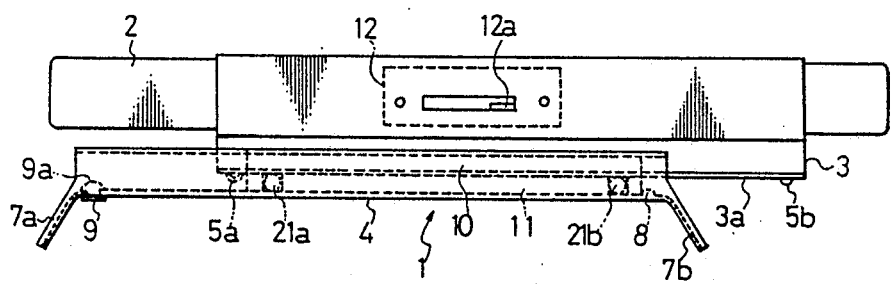
FIG. 2 is a side view of the above slide rail.

In the drawings, numeral (1) designates a slide rail, which comprises a movable rail (3) extending downwardly from the side surface portion of a cushion frame (2) and fixed rail (4) to be fixed to the floor side of a vehicle. The movable rail (3) includes a lower portion which is opened externally to provide a U-shaped section. The movable rail (3) is provided in the lower end thereof with a lower flange (3a), which flange (3a) is in turn formed with embossments (5a) and (5b) respectively in the front and rear ends thereof. On the other hand, the fixed rail (4) is formed in a square-barrel shape which has a spaced portion (6) extending along the internal edge of the top surface portion (4a) thereof. The fixed rail (4) is provided with integral leg piece members (7a) and (7b) which are respectively disposed forwardly and rearwardly of the fixed rail (4). Also, the rail (4) is provided in the rear end of the bottom surface portion (4b) thereof with an embossment (8) projecting upwardly, and is formed with a through-bore (9) in the front end of the bottom surface portion (4b).

Then, upper and lower sliders (10) and (11) are inserted between the above-mentioned movable and fixed rails (3) and (4), and the movable rail (3) is assembled to the fixed-side rail (4) via these two sliders (10), (11) such that it can be slidingly moved fore and aft relative to the fixed rail (4). Numeral (12) designates a lock device for locking the movable rail (3) at an arbitrary position relative to the fixed rail (4). Although the lock device (12) is not described in detail, generally speaking, in the lock device (12), a locking member which is interconnected with an operation lever (12a) is engaged with one of engagement portions (13) formed in an internal edge flange portion (4c) in the fixed rail (4) by means of operation of the operation lever (12a) so as to lock the movable rail (3) at a desired position.

Figure 4:
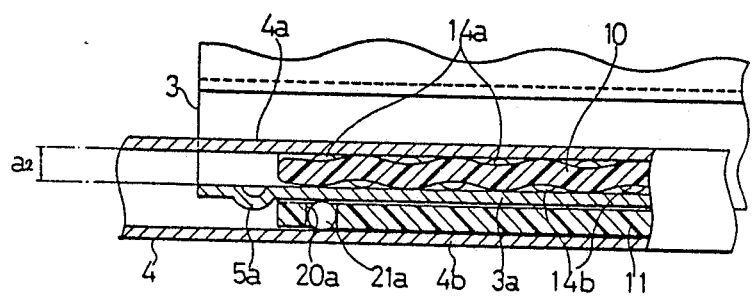
FIG. 4 is a partially cut-away, side view of the main portions of the above slide rail.

Now, the upper slider (10) is formed of a synthetic resin material such as polyethylene, nylon, polyacetal or the like, which has a desired elasticity. The upper slider (10) comprises two support surface portions (10a), (10b) respectively disposed in the forward and rearward portions thereof and a connecting arm portion (10c) which is narrower in width than the support surface portions (10a), (10b) and serves to interconnect the two support surface portions with each other. The front and rear support surface portions (10a) and (10b) are provided on the respective top and bottom surfaces thereof with projections (14a) and (14b) respectively having a spherical tip end. The projections (14a) and (14b) are transversely aligned with one another and are spaced at given intervals from one another longitudinally. Also, the upper and lower spherical projections (14a) and (14b) are arranged so as to alternate with one another vertically. The thickness a1 of the upper slider (10) including the upper and lower spherical projections (14a), (14b) is slightly greater than the height a2 of a slider insertion portion (FIG. 4) existing between the lower flange (3a) of the movable rail (3) and the top surface portion (4a) of the fixed rail (4).

Also, each of the front and rear support surface portions (10a) and (10b) of the upper slider (10) has an inner end portion which is slightly projected upwardly to provide a raised edge (15).

Further, each of the front and rear support surface portions (10a) and (10b) of the upper slider (10) is provided in the respective two side edge surfaces thereof with a pair of arc-shaped projections (16a) and a pair of arc-shaped projections (16b); the two pairs (16a) and (16b) are opposed to each other; and, one projection (16a) is longitudinally spaced at a given interval from the other projection (16a), while one projection (16b) is longitudinally spaced at a given interval from the other projection (16b). Slits (17a) and (17b) are formed internally of the arc-shaped projections (16a) and (16b) in such a manner that they correspond to each other. The width b1 of the upper slider (10) including the arc-shaped projections (16a) and (16b) is slightly greater than the width b2 of the above-mentioned slider insertion portion between the movable and fixed rails (3) and (4).

Figure 3:
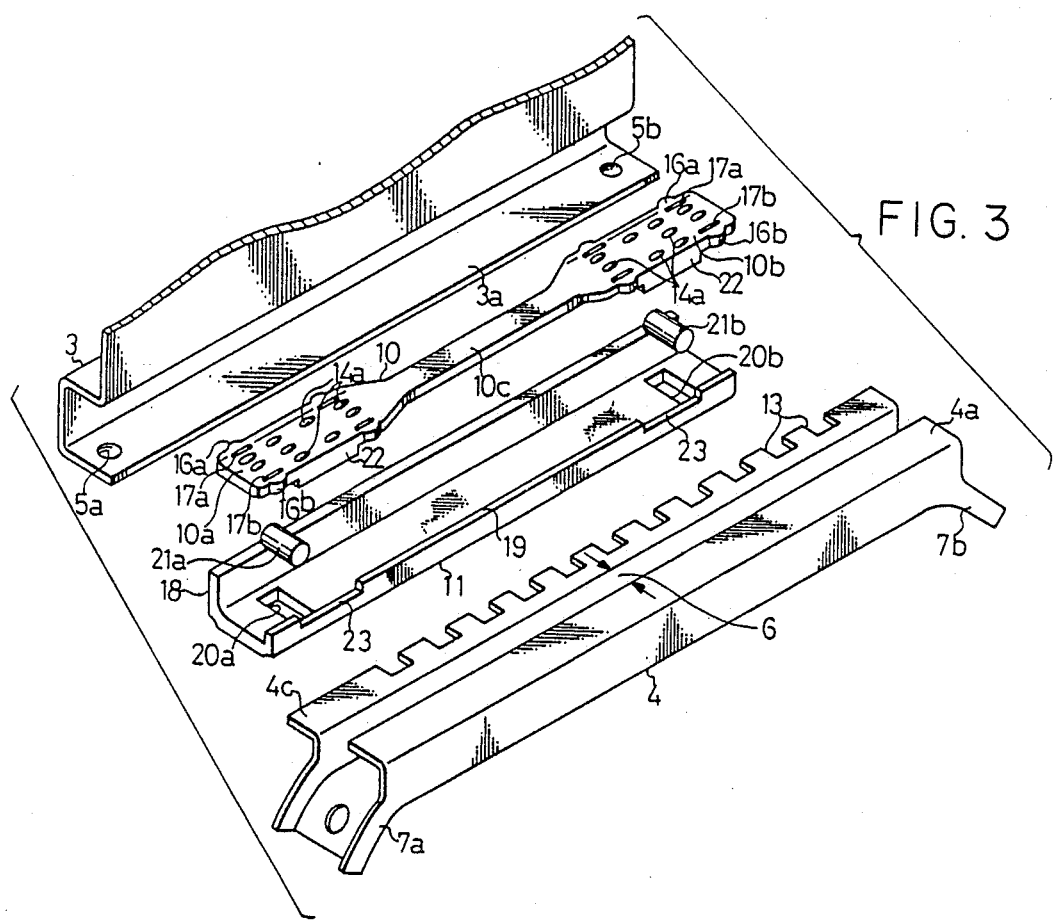
FIG. 3 is an exploded perspective view of the above slide rail.

On the other hand, the lower slider (11) is formed of a synthetic resin material as with the upper slider (10). It is formed with a raised edge (18) in the inner edge portion thereof and a projected edge (19) in the outer edge portion thereof. The lower slider (11) is also formed in the front and rear end portions thereof with elongated bores (20a) and (20b) extending transversely of the lower slider (11), respectively (FIG. 3). Rollers (21a) and (21b), each of which has a diameter slightly greater than the thickness of the lower slider (11), are rotatably fitted into the elongated bores (20a) and (20b), respectively.

In order that the two sliders (10) and (11) may be engaged with each other in the longitudinal direction thereof, there are formed projections (22) respectively on the lower surfaces of the outer edge portions of the front and rear support surface portions (10a) and (10b) in the upper slider (10), and, correspondingly to the projections (22), there are formed recesses (23) respectively in the projected edge (19) of the lower slider (11).

Then, the thus formed upper slider (10) and lower slider (11) are connected with the lower flange (3a) of the movable-side rail (3), that is, the upper slider (10) is abutted on the top surface of the lower flange (3a) and the lower slider (11) is abutted against the lower flange (3a) from the bottom surface to the side surface of the vertically rising portion of the movable rail (3), while on the corresponding outer edge side of the upper and lower sliders the projections (22) are fitted into the recesses (23) respectively. The movable rail (3), to which the upper and lower sliders (11) and (12) have been attached in this manner, is inserted into the fixed rail (4) from ahead in such a manner that the rising portion of the movable-side rail (3) as well as the raised edges (15) and (18) of the upper and lower sliders (10) and (11) correspond to the spaced portion (6) of the fixed rail (4). Further, in a condition where the upper and lower sliders (10) and (11) are positioned inside the fixed rail (4), a projecting pin (9a) is inserted through the through-bore (9) in the front end of the fixed rail (4) and is then crimped, so that the movable rail (3) can be assembled to the fixed rail (4).

Figure 5:
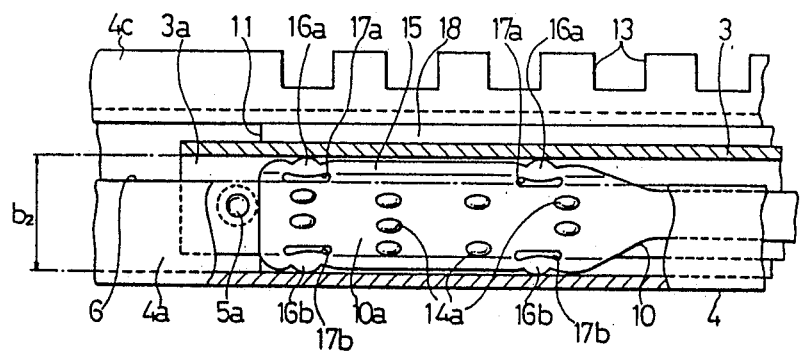
FIG. 5 is a partially cut-away, plan view of the main portions of the above slide rail.
Figure 6:
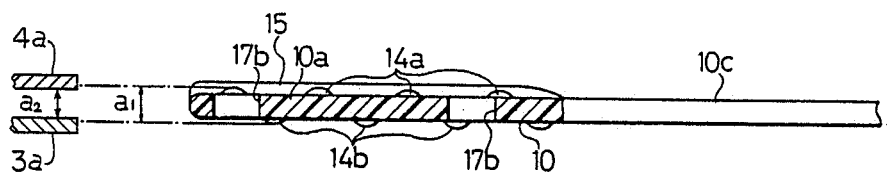
FIG. 6 is a partially cut-away, side view of an upper slider employed in the above slide rail; and, FIG. 7 is a plan view of the above upper slider.
Figure 7:
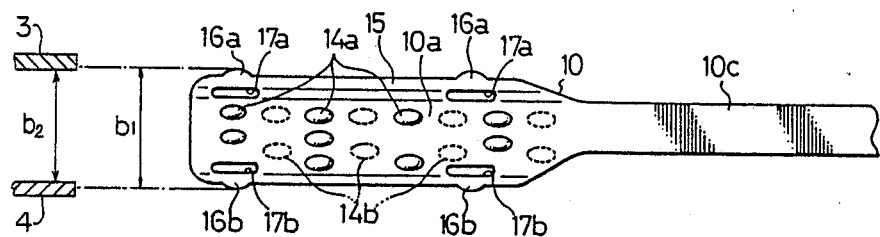

As a result of the above-mentioned assembly, the rollers (21a) and (21b) fitted into the lower slider (11) are respectively brought into rolling contact with the bottom surface of the lower flange (3a) of the movable rail (3) as well as the bottom surface of the fixed rail (4), and the movable-side rail (3) is supported by these rollers (21a) and (21b). The upper slider (10) is resiliently deformed in a vertically undulating manner as the alternatingly formed spherical projections (14a), (14b) are resiliently pressed respectively (see FIG. 4). Also, the arc-shaped projections (16a) and (16b) are respectively deformed in a inwardly compressed manner as the slits (17a) and (17b) are collapsed (see FIG. 5), and are then press fitted between the lower flange (3a) of the movable rail (3) and the top surface (4a) of the fixed rail (4).

Since the upper slider (10) is inserted between the movable-side rail (3) and fixed-side rail (4) in such deformed condition as mentioned above, the amount of resilient deformation of the upper slider (10) varies according to clearances produced due to the dimensional errors between the two rails (3) and (4). That is, when the dimensional error between the two rails (3) and (4) is great, the upper slider (10) is resiliently deformed greatly and, for the small dimensional errors, the upper slider (10) is resiliently deformed to a small extent, which permits absorption of loosenesses possibly produced between the two rails (3) and (4). Therefore, the movable rail (3) can be slidingly moved smoothly relative to the fixed rail (4) without producing such loosenesses or strange sounds.

Also, due to the fact that the upper slider (10) can be resiliently deformed according to the clearances between the movable rail (3) and fixed-side rail (4) in the above-mentioned manner, the rollers (21a) and (21b) fitted into the lower slider (11) may be of one and the same kind and dimension, that is, there is no need to select rollers corresponding to the sizes of clearances due to dimentional variations of the rails produced out of various kinds of rollers of different dimensions in the assembling step. As a result of this, an efficiency in assembling a slide rail can be enhanced and at the same time the manufacturing cost of the slide rail can be reduced effectively.

Further, since the upper slider (10) is inserted between the movable and fixed rails (3) and (4) with only the spherical projections (14a), (14b) and arc-shaped projections (16a), (16b) thereof being in contact with the two rails, that is, the upper slider (10) is inserted between and in point-contact with the two rails, it has a smaller resistance while it is slidingly moved. As a result of this, the movable rail (3) can be slidingly moved more smoothly relative to the fixed rail (4). Also, even when the slider insertion portion between the movable- and fixed rails (3) and (4) is extremely narrow because of varying diameters of the rollers (21a) and (21b) fitted into the lower slider (11), by running in or sliding the movable rail (3) relative to the fixed rail (4) several times the upper slider (10) can be fitted securely and thus can be operated normally.

Moreover, since the upper slider (10) is simple in structure, a slide rail which is inexpensive and stable in performance can be supplied.

Although in the above-mentioned embodiment only the slide rail provided on one side of the seat is illustrated, of course, on the other side of the seat there is also provided a slide rail which is symmetrically identical in structure with the illustrated slide rail.

Also, although in the above-mentioned embodiment the upper slider (10) is constructed such that it can be engaged with the lower slider (11) and can be slidingly moved integrally therewith, this is not limitative but only illustrative, and, therefore, according to the invention, the upper and lower sliders may be inserted separately.

As has been described hereinbefore, in the slide rail according to the invention, since the upper slider is formed of a material having a desired elasticity, is provided on the top and bottom surfaces thereof with the vertically alternating projections as well as on the two side surfaces thereof with the transversely opposing projections, and is formed with the slits respectively disposed inwardly of the last-mentioned projections, the upper slider, while it is inserted or fitted between the movable and fixed rails, can be elastically deformed to absorb the clearances produced due to the dimensional errors between the two rails, so that the movable rail can be slidingly moved smoothly relative to the fixed rail without producing loosenesses or strange sounds therebetween. Also, in the present invention, the sliding resistance of the upper slider is reduced due to the fact that it is inserted between the movable and fixed rails in point-contact therewith in the above-mentioned projections formed on the top and bottom as well as two side surfaces thereof, so that the movable rail can be slidingly moved more smoothly relative to the fixed rail. In other words, the invention, in fact, provides several practical effects.

What is claimed is:

1. A slide rail comprising a movable rail adapted for connection to a seat, said movable rail including a U-shaped lower portion; upper and lower sliders disposed on the top and bottom surfaces, respectively, of a lower flange forming part of the lower portion of said movable rail; and a substantially square shaped fixed rail adapted for fastening to the floor of a vehicle, said lower flange being positioned in said fixed rail, together with said upper and lower sliders, in such a way that said movable rail can be slidingly moved back and forth, wherein said upper slider, which is formed of a material having a desired elasticity, is provided on its top and bottom surfaces with a number of vertically alternating projections, together with projections on its two side surfaces, and said upper slider is also provided with slits extending from said top to said bottom surface and respectively disposed inwardly of said projections on said side surfaces.

2. A slide rail as defined in claim 1, wherein said upper slider includes two support surface sections respectively in the front and rear portions thereof and a connecting arm section disposed between said two support surface sections for interconnecting said two sections, said connecting arm section being narrower in width than said two support surface sections, and wherein said projections provided on said top and bottom surfaces as well as on said two side surfaces and said slits are all located in said support surface sections.

3. A slide rail as defined in claim 1, wherein said lower flange of said movable rail includes two embossments respectively formed in the front and rear ends thereof, and the bottom surface of said fixed rail is provided in the rear end thereof with an upwardly projecting embossment and is formed in the front end thereof with a through-bore.

4. A slide rail as defined in claim 1, wherein said projections provided on said top and bottom surfaces of said upper slider are respectively formed in a substantially hemispherical shape and said projections on said two side surfaces of said upper slider are respectively formed in an arcuate shape.

5. A slide rail as defined in claim 1, wherein said projections on said top and bottom surfaces of said upper slider are arranged such that they alternate with one another in the horizontal direction across its height.

6. A slide rail as defined in claim 2, wherein the front and rear support surface sections of said upper slider are respectively provided in the inner end portions thereof with raised portions projecting slightly upwardly.

7. A slide rail as defined in claim 1, wherein a vertical thickness of said upper slider including said projections provided thereon is slightly greater than a height of the space between said lower flange of said movable rail and a top surface of said fixed rail.

8. A slide rail as defined in claim 2, wherein a width of each of said support surface sections of said upper slider including said projections on said two side surfaces thereof is slightly greater than a corresponding width of the space between said movable and fixed rails.

9. A slide rail as defined in claim 1, wherein said lower slider is foremd in the front and rear end portions thereof with elongated bores extending transversely, and rollers having a diameter greater than the thickness of said lower slider are respectively fitted into said elongated bores in a rotatable manner.

10. A slide rail as defined in claim 1, wherein said lower slider includes a raised edge in the inner edge portion thereof and a projected edge in the outer edge portion thereof.

11. A slide rail as defined in claim 2, wherein the front and rear support surface sections of said upper slider are respectively provided in the outer edge lower surfaces thereof with projections and said lower slider is formed in a projected edge thereof with recesses respectively corresponding to said projections in said outer edge lower surfaces of upper slider, so that said upper and lower sliders can be engaged with each other in the longitudinal direction thereof.

* * * * *